US010503602B2

(12) United States Patent
Kashi Visvanathan et al.

(10) Patent No.: US 10,503,602 B2
(45) Date of Patent: Dec. 10, 2019

(54) DELETION AND RESTORATION OF ARCHIVED DATA IN CLOUD/OBJECT STORAGE

(71) Applicant: VMware, Inc., Palo Alto, CA (US)

(72) Inventors: Satish Kumar Kashi Visvanathan, San Jose, CA (US); Pooja Sarda, Cupertino, CA (US); Ilya Langouev, Santa Cruz, CA (US)

(73) Assignee: VMware Inc., Palo Alto, CA (US)

( * ) Notice: Subject to any disclaimer, the term of this patent is extended or adjusted under 35 U.S.C. 154(b) by 0 days.

(21) Appl. No.: 15/870,728

(22) Filed: Jan. 12, 2018

(65) Prior Publication Data

US 2019/0220360 A1 Jul. 18, 2019

(51) Int. Cl.
*G06F 3/06* (2006.01)
*G06F 11/14* (2006.01)
*H04L 29/08* (2006.01)
*G06F 16/907* (2019.01)

(52) U.S. Cl.
CPC .......... *G06F 11/1435* (2013.01); *G06F 3/067* (2013.01); *G06F 3/0652* (2013.01); *G06F 16/907* (2019.01); *H04L 67/1097* (2013.01); *G06F 2201/84* (2013.01)

(58) Field of Classification Search
CPC ............. G06F 11/1446; G06F 11/1448; G06F 11/1451; G06F 3/065; G06F 3/067; G06F 2201/84; G06F 17/30088; G06F 17/30327
See application file for complete search history.

(56) References Cited

U.S. PATENT DOCUMENTS

| 6,594,744 B1* | 7/2003 | Humlicek ............. G06F 3/0601 707/999.202 |
| 8,190,836 B1 | 5/2012 | Zheng et al. |
| 8,250,033 B1 | 8/2012 | De Souter et al. |
| 8,789,208 B1 | 7/2014 | Sundaram et al. |
| 8,805,967 B2* | 8/2014 | Taylor ................. G06F 11/2005 709/219 |
| 8,832,039 B1* | 9/2014 | Sorenson, III ............ G06F 7/00 707/679 |
| 9,009,106 B1* | 4/2015 | Aron ....................... G06F 11/14 707/610 |

(Continued)

OTHER PUBLICATIONS

Shuan Qiu, Jingyu Zhou, Tao Yang, Versioned File Backup and Synchronization for Storage Clouds, 2013, IEEE/ACM International Symposium on Cluster, Cloud, and Grid Computing (Year: 2013).*

(Continued)

*Primary Examiner* — Khoa D Doan

(57) ABSTRACT

Techniques for deleting a snapshot of a data set archived in cloud/object storage are provided. In one set of embodiments, a computer system can identify data blocks that are part of the snapshot and are referred to by an incremental child snapshot of the snapshot. The computer system can further create a new metadata object that includes metadata entries for the identified data blocks, each metadata entry comprising an identifier of the incremental child snapshot, an identifier of a data block, and an identifier of a data object of the incremental child snapshot where the data block is stored. The computer system can then associate the new metadata object with the incremental child snapshot in the cloud/object storage.

18 Claims, 10 Drawing Sheets

(56) References Cited

U.S. PATENT DOCUMENTS

| | | | |
|---|---|---|---|
| 9,020,903 B1* | 4/2015 | Vempati | G06F 12/121 |
| | | | 707/674 |
| 9,547,560 B1* | 1/2017 | Lee | G06F 3/0619 |
| 10,089,187 B1 | 10/2018 | Pecoraro et al. | |
| 2003/0131278 A1* | 7/2003 | Fujibayashi | G06F 11/1469 |
| | | | 714/6.3 |
| 2006/0080370 A1 | 4/2006 | Torii et al. | |
| 2006/0230243 A1* | 10/2006 | Cochran | G06F 16/128 |
| | | | 711/162 |
| 2006/0230244 A1* | 10/2006 | Amarendran | G06F 3/0619 |
| | | | 711/162 |
| 2007/0150677 A1 | 6/2007 | Homma et al. | |
| 2007/0186127 A1* | 8/2007 | Desai | G06F 11/1448 |
| | | | 714/13 |
| 2008/0282875 A1 | 11/2008 | Wayda et al. | |
| 2010/0280996 A1 | 11/2010 | Gross, IV et al. | |
| 2011/0167221 A1 | 7/2011 | Pangal et al. | |
| 2012/0079221 A1* | 3/2012 | Sivasubramanian | G06F 11/1456 |
| | | | 711/162 |
| 2012/0284309 A1 | 11/2012 | Adkins et al. | |
| 2013/0111262 A1 | 5/2013 | Taylor et al. | |
| 2017/0117048 A1 | 4/2017 | Choi et al. | |
| 2017/0185348 A1 | 6/2017 | Byun | |
| 2018/0121362 A1 | 5/2018 | Garg et al. | |
| 2018/0260281 A1* | 9/2018 | Monk | G06F 11/1448 |
| 2018/0267985 A1* | 9/2018 | Badey | G06F 16/128 |
| 2019/0227733 A1* | 7/2019 | Zeng | G06F 3/0604 |

OTHER PUBLICATIONS

Office Action dated Mar. 7, 2019; U.S. Appl. No. 15/870,711; (21 pgs.).

Shuang Qiu et al., "Versioned File Backup and Synchronization for Storage Clouds", 2013 13th IEEE/ACM International Symposium on Cluster, Cloud, and Grid Computing, May 13, 2013, pp. 302-310.

* cited by examiner

DELETION AND RESTORATION OF ARCHIVED DATA IN CLOUD/OBJECT STORAGE

CROSS-REFERENCES TO RELATED APPLICATIONS

The present application is related to the following commonly-owned U.S. Patent Applications, filed concurrently herewith:

U.S. patent application Ser. No. 15/870,711 entitled "Object Format and Upload Process for Archiving Data in Cloud/Object Storage";

U.S. patent application Ser. No. 15/870,740 entitled "Handling Fragmentation of Archived Data in Cloud/Object Storage"; and U.S. patent application Ser. No. 15/870,750 entitled "Supporting Glacier Tiering of Archived Data in Cloud/Object Storage."

The entire contents of all of the foregoing applications are incorporated herein by reference for all purposes.

BACKGROUND

In computing, "object storage" is a data storage model that manages data in the form of containers referred to as objects, rather than in the form of files (as in file storage) or in the form of blocks (as in block storage). "Cloud/object storage" is an implementation of object storage that maintains these objects on servers that are accessible via the Internet. Examples of commercially-available cloud/object storage services include Amazon's Simple Storage Service (S3) and Google Cloud Storage.

Cloud/object storage generally offers high scalability, high durability, and relatively low cost per unit of storage capacity, which makes it an attractive solution for companies seeking to archive large volumes of data for long-term backup and recovery purposes. However, there are a number of complexities that make it difficult to use existing cloud/object storage services as a backup target. First, many existing cloud/object storage services can only guarantee eventual consistency to clients, which means that if an update is made to a given object, all subsequent client accesses to that object will eventually, but not necessarily immediately, return the object's updated value. Some cloud/object storage services mitigate this by guaranteeing read-after-write consistency for newly created objects. But, without a stronger consistency model that also guarantees read-after-write consistency for modified objects, it is difficult to build a data backup/restore system that ensures clients have a consistent view of the archived data.

Second, the network bandwidth between a company's on-premise (i.e., internal) systems and cloud/object storage is usually limited due to the need to traverse the Internet. Similarly, the latency from on-premise equipment to cloud/object storage is relatively high, and network timeouts or other network issues can be prevalent. These factors increase the costs of writing a large number of objects per backup task and can cause write throttling to occur.

Third, existing cloud/object storage services generally do not support object locking or any other mechanism to synchronize concurrent access to an object by multiple clients. This can complicate the implementation of certain archive management operations like delete and restore.

Fourth, many cloud/object storage services support automated data migration and replication features such as glacier tiering and cross-region replication. While these features add value for customers, they can also cause consistency issues when using the services as a backup target that need to be accounted for.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for facilitating the archival of data in cloud/object storage for data protection (i.e., backup and recovery) purposes. These techniques include, among other things, (1) an object format for representing the data in an efficient manner and a process for uploading the data to the cloud/object storage in accordance with the object format; (2) techniques for implementing the deletion and restoration of archived data without requiring explicit synchronization; (3) techniques for efficiently dealing with fragmentation of the archived data; and (4) techniques for cloning the archived data in the cloud/object storage to ensure data consistency when glacier tiering is enabled.

The foregoing and other aspects are described in further detail below.

2. System Environment

Figure 1:
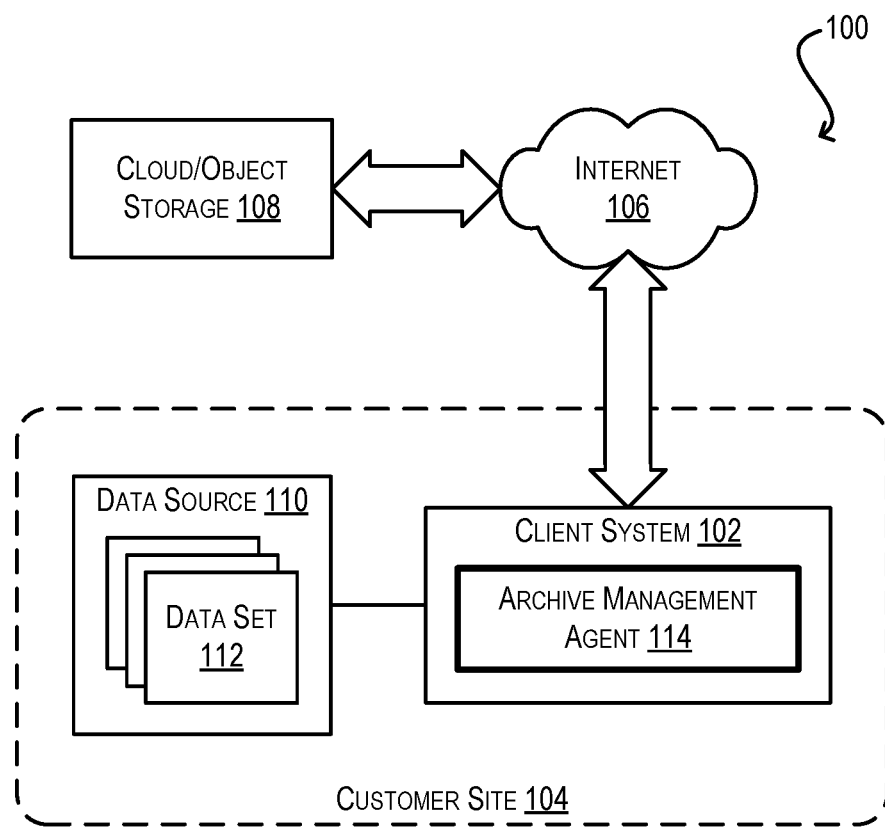
FIG. 1 depicts a system environment according to an embodiment.

FIG. 1 is a simplified block diagram of a system environment 100 in which embodiments of the present disclosure may be implemented. As shown, system environment 100 includes an on-premise client system 102 at a customer site 104 that is connected via the Internet 106 to a cloud/object storage service/system 108. Client system 102 may be, e.g., a physical computer system or a virtual machine (VM). Cloud/object storage 108 may be any such storage service/system known in the art, such as Amazon's S3.

Although an exhaustive discussion of cloud/object storage 108 is beyond the scope of this disclosure, the following are a few salient characteristics that may be exhibited by cloud/object storage 108 in certain embodiments:

Each object in cloud/object storage 108 can be maintained in a flat address space and can include the data for the object itself (i.e., the object's data payload), a variable amount of object metadata, and a globally unique identifier (i.e., key).

Cloud/object storage 108 can expose a relatively simple data access API (application programming interface) to client system 102 that includes (1) a GET(k) function for retrieving an object identified by specified key k; (2) a PUT(o, k) function for creating or updating specified object o identified by specified key k; and (3) a DELETE(k) function for deleting an object identified by specified key k.

Typically, cloud/object storage 108 will be owned and maintained by a storage service provider, such as Amazon, that is distinct from the entity that owns customer site 104. However, in some embodiments, cloud/object storage 108 can be part of a private cloud that is owned/maintained by the same entity as customer site 104.

In addition to being connected to cloud/object storage 108, client system 102 is also connected to an on-premise data source (e.g., a storage device or server) 110 that includes a data set 112. Data set 112 may be, e.g., virtual disk data for one or more VMs, a document repository, or any other type of data set that is modified on an ongoing basis at customer site 104. In this environment, the goal of client system 102 is to periodically archive data set 112 from on-premise data source 110 to cloud/object storage 108 for data protection, such that the most recently backed-up copy of data set 112 can be restored from cloud/object storage 108 if a disaster or failure occurs that causes the on-premise copy of the data set to be lost. However, as mentioned previously, there are a number of challenges that make it difficult to accomplish this in an efficient and performant manner (e.g., weak consistency guarantees offered by cloud/object storage 108, low bandwidth and high latency between customer site 104 and cloud/object storage 108, lack of object synchronization, consistency issues caused by glacier tiering and cross-region replication, etc.).

To address the foregoing and other related issues, client system 102 of FIG. 1 is enhanced to include a novel archive management agent 114. In various embodiments, archive management agent 114 may be implemented in software, in hardware, or a combination thereof. In a particular embodiment, archive management agent 114 may be implemented as a user-mode application and thus can make use of certain network security protocol libraries for communicating with cloud/object storage 108, such as Transport Layer Security (TLS), that are only available in user space.

As detailed in the sections that follow, archive management agent 114 can employ various techniques for backing up data set 112 to, and restoring data set 112 from, cloud/object storage 108 in a manner that solves many of the problems presented by these tasks. For instance, in one set of embodiments (described in section (3) below), archive management agent 114 can receive incremental point-in-time images (i.e., snapshots) of data set 112 from data source 110, package each snapshot into an efficient object format comprising one or more new data objects and one or more new metadata objects, and upload the objects in a streaming fashion to cloud/object storage 108. With this object format and upload process, archive management agent 114 can minimize the amount of space needed on cloud/object storage 108 for storing the archived data, avoid overwriting existing objects in storage 108 (and thereby avoid the issues associated with eventual consistency), and keep the resource overhead on client system 102 needed for uploading relatively low.

In another set of embodiments (described in section (4) below), archive management agent 114 can implement workflows for deleting and restoring snapshots from cloud/object storage 108 that eliminate the need for explicit synchronization between these two operations, and that take into account the incremental nature of the archived snapshots. In some embodiments, archive management agent 114 can further optimize deletion via range-based and batching techniques, and can further enhance the restore process to account for issues that may occur when restoring a snapshot from a replicated region of cloud/object storage 108.

In yet another set of embodiments (described in section (5) below), archive management agent 114 can implement techniques for reducing the fragmentation of snapshot objects maintained in cloud/object storage 108 in a way that advantageously amortizes the network I/O costs of this defragmentation over multiple snapshot uploads.

In yet another set of embodiments (described in section (6) below), archive management agent 114 can implement a workflow for cloning snapshot objects maintained in a standard tier of cloud/object storage 108, before those objects are migrated to a separate glacier tier per the storage system's glacier tiering functionality. This cloning workflow eliminates consistency problems that may arise when attempting to restore a snapshot from the standard tier where some of the snapshot's objects (or referred-to objects in a parent snapshot) have been migrated to the glacier tier.

It should be appreciated that system environment 100 of FIG. 1 is illustrative and not intended to limit embodiments of the present disclosure. For example, although only a single on-premise client system 102 is shown, any number of client systems may be configured to interact with cloud/object storage 108 for the purpose of backing up or restoring data set 112, potentially on a concurrent basis. Further, the various entities depicted in FIG. 1 may be organized according to alternative configurations or arrangements and/or may include components or functions that are not specifically described. One of ordinary skill in the art will recognize other variations, modifications, and alternatives.

3. Object Format and Upload Process

As noted above, in certain embodiments archive management agent 114 can implement the uploading (i.e., archiving) of data set 112 to cloud/object storage 108 by (1) receiving incremental snapshots of data set 112 on a periodic basis; (2) packaging each snapshot into an object format comprising one or more new data objects and one or more new metadata objects; and (3) writing the data object(s) and metadata object(s) to cloud/object storage 108 in a streaming manner (i.e., as the objects are filled with the snapshot data) using cloud/object storage 108's PUT function.

This high level approach has a number of advantages. First, since each snapshot of data set 112 is incremental (i.e., it only contains data changed since the last snapshot), the amount of storage space consumed on cloud/object storage 108, as well as the network bandwidth needed to transfer the snapshot data, can be kept low. In some embodiments, the data in each snapshot can be compressed and/or de-duplicated to further reduce its size.

Second, by uploading only new data and metadata objects to cloud/object storage 108 for each snapshot, existing objects in cloud/object storage 108 do not need to be modified. This bypasses the consistency problems that can arise from the weak eventual consistency guarantee provided by most existing cloud/object storage services.

Third, since archive management agent 114 performs the upload in a streaming manner, there is no need to stage any of the data or metadata on client system 102 as part of the upload process. This results in very low resource overhead on client system 102.

3.1 Upload Workflow

Figure 2:
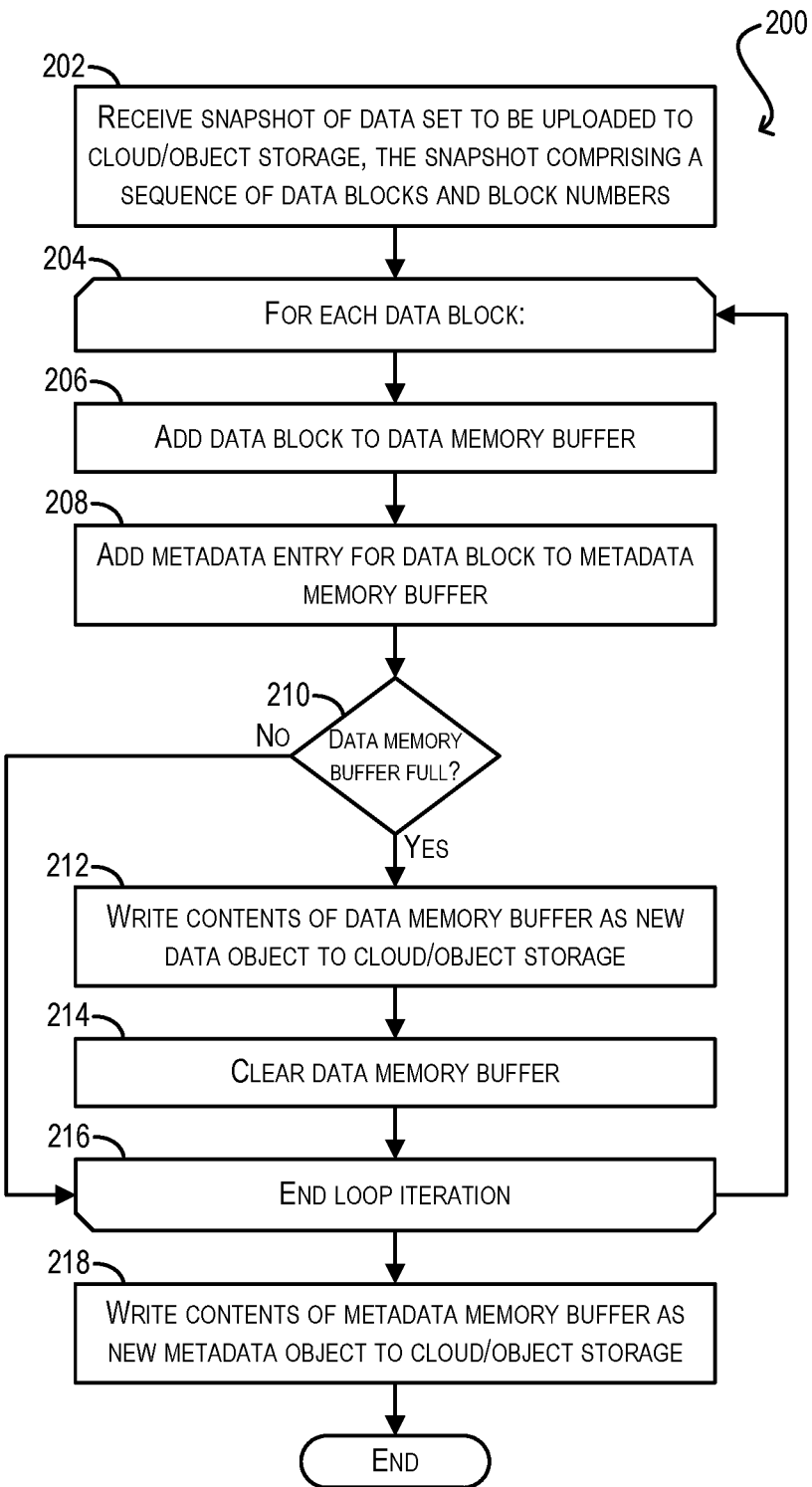
FIG. 2 depicts an upload workflow according to an embodiment.

FIG. 2 depicts a workflow 200 that details the upload process that may be carried out by archive management agent 114 and the manner in which each snapshot may be packaged into data and metadata objects for transfer to cloud/object storage 108 according to an embodiment.

Starting with block 202, archive management agent 114 can receive (from, e.g., data source 110) a snapshot of data set 112 to be uploaded to cloud/object storage 108. If this is the first time data set 112 is being uploaded, the snapshot received at this step can include the entirety of data set 112. Otherwise, the snapshot received at this step can be an incremental, or "delta," snapshot that solely includes data in data set 112 that has changed since the last uploaded snapshot. It is assumed that the snapshot is received as a sequence of filesystem data blocks and corresponding block numbers.

At block 204, archive management agent 114 can enter a loop for each data block in the snapshot, as it is received. Within the loop, archive management agent 114 can add the data block (in the form of a "chunk" that includes the data block and some related block metadata) to a data memory buffer of a fixed size (e.g., 1 megabyte (MB), 4 MB, etc.) (block 206). The fixed size of this data memory buffer can correspond to the size of the individual data objects that will be uploaded to cloud/object storage 108.

In addition, archive management agent 114 can add a metadata entry for the data block to a separate metadata memory buffer (block 208). The added metadata entry can include an identifier of the current snapshot (i.e., snapshot ID), an identifier of the current data block (i.e., block number), and an identifier of the current data object being populated via the data memory buffer (i.e., object ID).

At block 210, archive management agent 114 can check whether the data memory buffer is now full. If so, agent 114 can write the contents of the data memory buffer as a new data object to cloud/object storage 108 via storage 108's PUT function (block 212) and can clear the data memory buffer (block 214). As part of block 212, archive management agent 114 can optionally create a header in the data object before writing it to cloud/object storage 108 that comprises metadata regarding the blocks included in the data object. The current loop iteration can then end (block 216), and archive management agent 114 can repeat the loop if there are more data blocks in the snapshot to process.

On the other hand, if the data number buffer is not full at block 210, archive management agent 114 can proceed directly to the end of the current loop iteration (block 216) and the loop can subsequently repeat as mentioned above.

Once all of the data blocks in the snapshot have been received and processed, archive management agent 114 can write the contents of the metadata memory buffer as a new metadata object to cloud/object storage 108 via storage 108's PUT function (block 218). In a particular embodiment, agent 114 can name the metadata object using an identifier of the format "SX.Y," where X is the snapshot ID and Y is a unique metadata object number relative to the snapshot ID. Workflow 200 can then end. Note that archive management agent 114 can re-execute this workflow each time a new snapshot for data set 112 is generated and received.

Figure 3:
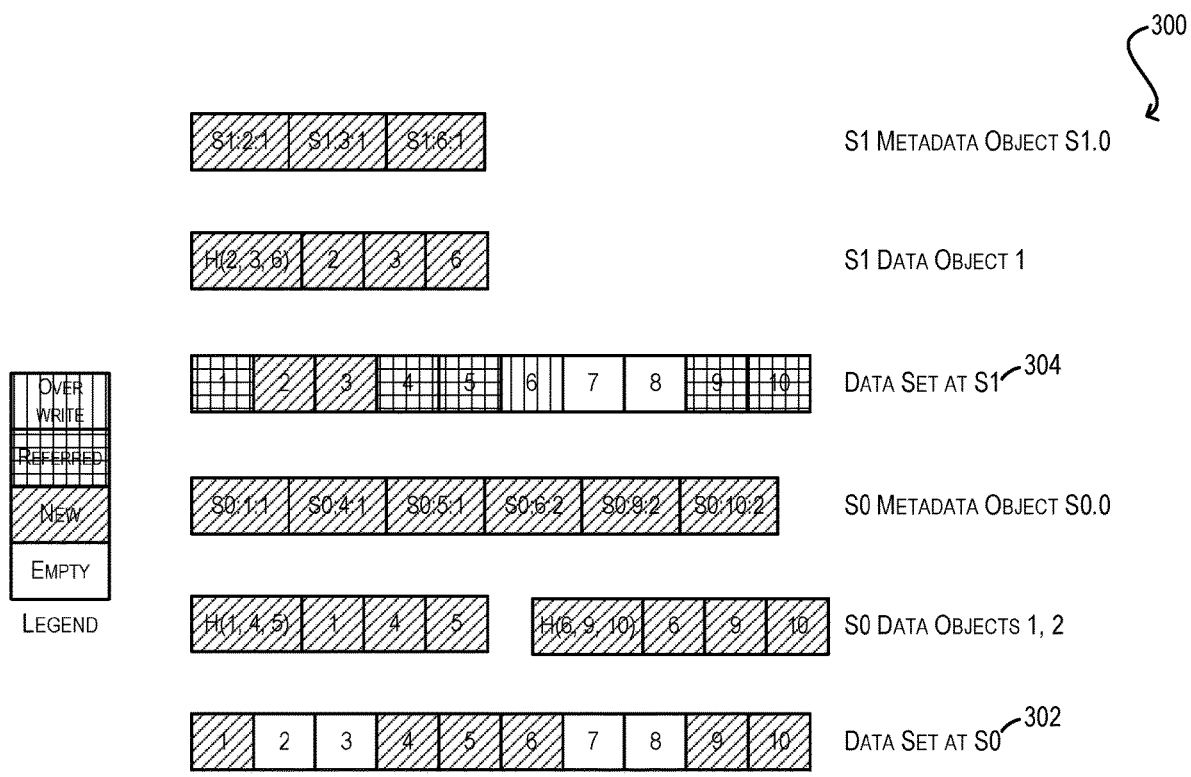
FIG. 3 is a diagram illustrating an example result of the upload workflow of FIG. 2 according to an embodiment.

To clarify the processing performed in workflow 200, FIG. 3 depicts a diagram 300 that illustrates the data and metadata objects that are created via this workflow in cloud/object storage 108 for two example snapshots S0 and S1 of data set 112. As shown via reference numeral 302, at the time snapshot S0 is taken, data set 112 includes new data at blocks 1, 4, 5, 6, 9, and 10 (blocks 2, 3, 7, and 8 are empty). This results in the creation of two new data objects in cloud/object storage 108 for S0: a first data object 1 that comprises data blocks 1, 4, and 5 (along with a header H with metadata for these blocks); and a second data object 2 that comprises data blocks 6, 9, and 10 (along with a header H with metadata for these blocks). In addition, one new metadata object S0.0 is created in cloud/object storage 108 for S0 that includes a metadata entry for each data block included in data objects 1 and 2. Each metadata entry identifies the current snapshot S0, the data block number, and the ID of the data object in which that data block is included.

Turning now to reference numeral 304, at the time snapshot S1 is taken, new data is added to data set 112 for data blocks 2 and 3, and data block 6 is overwritten (blocks 1, 4, 5, 9, and 10 remain the same from S0 and blocks 7 and 8 remain empty). This results in the creation of one new data object 1 in cloud/object storage 108 for S1 that comprises new/modified data blocks 2, 3, and 6 (along with a header H with metadata for these blocks). In addition, one new metadata object S1.0 is created in cloud/object storage 108 for S1 that includes metadata entries for data blocks 2, 3, and 6 indicating that those data blocks are included in data object 1 of snapshot S1. Note that the metadata objects for S1 and S0 (the parent snapshot of S1) should be consolidated in order to obtain a full view of the contents of data set 112 at the time of S1. This is because metadata object S1.0 only identifies the data blocks of data set 112 that were modified in incremental snapshot S1 and thus do not identify data blocks that remain the same between S1 and S0 (i.e., blocks 1, 4, 5, 9, and 10). Stated another way, snapshot S1 implicitly "refers to" blocks 1, 4, 5, 9, and 10 in snapshot S0.

3.2 Example Data Object Format

Figure 4:
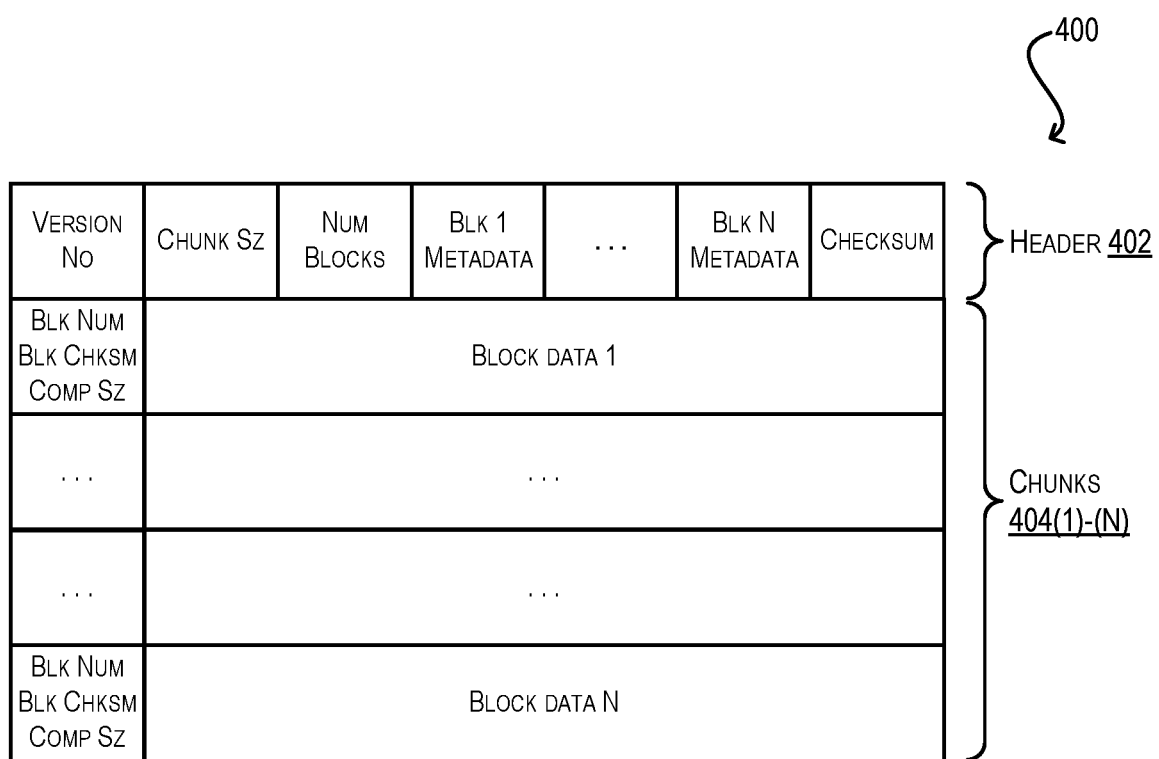
FIG. 4 is a diagram illustrating an example data object format according to an embodiment.

FIG. 4 is a diagram 400 illustrating an example object format that may be used for each data object created by archive management agent 114 according to an embodiment. Diagram 400 assumes that the data object is composed of N chunks, where each chunk includes one data block. Diagram 400 also assumes that the data blocks are compressed prior to being added to the data object.

According to this format, each data object comprises a header 402 that includes an object version number, a size of each chunk, a total number of data blocks (e.g., N), certain metadata fields for each block (e.g., uncompressed size, hash, etc.), and an object checksum. In addition, each chunk 404(1)-(N) of the data object includes its corresponding data block and per-chunk/block-level metadata (e.g., block number, block checksum, compressed size, etc.). It should be appreciated that this format is merely exemplary and various modifications, such as the addition or removal of metadata fields, are possible.

3.3 Alternative Metadata Object Representation

The upload workflow described above and shown in FIG. 2 effectively results in the creation of a single metadata object per snapshot on cloud/object storage 108 that identifies all of the data blocks included in that snapshot. While this metadata representation is relatively straightforward to implement, it can also make the restoration of individual files in data set 112 expensive. This is because a given file may be composed of many different data blocks which are spread out across multiple archived snapshots on cloud/object storage 108, and thus it is difficult for archive management agent 114 to know which data objects those data blocks are contained in without retrieving all of the per-snapshot metadata objects and locating the block references.

To solve this problem, in certain embodiments archive management agent 114 can alternatively implement a range-based representation for the metadata object(s) of each snapshot. For example, if the address space of data set 112 is 100 gigabytes (GB), agent 114 can create 100,000 (or some other number) of metadata objects for the data set per snapshot, where each metadata object corresponds to 1 MB of the address space of data set 112. Thus, one metadata object is created for a predefined sub-range of blocks within data set 112. The entries in each metadata object can correspond to the blocks within the metadata object's sub-range and can identify the data object (and potentially an offset within that data object) that holds the block data.

With this alternative metadata object representation, archive management agent 114 can implement coarse range-based operations that facilitate file-level restore. To minimize the effect of this representation on the storage usage in cloud/object storage 108, in cases where a snapshot is uploaded and a particular metadata object of the snapshot is no different than a previous/parent snapshot (i.e., none of the data blocks within the sub-range of the metadata object have been overwritten in the current snapshot), archive management agent 114 can simply create a link to the corresponding metadata object for that previous snapshot. This avoids the need to create a full set of metadata objects in cloud/object storage 108 for every snapshot when only a small amount of data is changed per snapshot.

4. Deletion and Restore

In order to serve as a comprehensive archiving and data protection solution, beyond uploading snapshots to cloud/object storage 108, archive management agent 114 should also support the explicit deletion of a previously stored snapshot (in order to, e.g., make space for newer snapshots) and the restoration of data set 112 from cloud/object storage 108 to customer site 104 with respect to a specified snapshot. However, there are a couple of challenges with implementing these two operations. First, since the data blocks/objects that are maintained in cloud/object storage 108 for a snapshot SX may be referred to by one or more child snapshots SY, SZ, etc. (as illustrated in FIG. 4) due to the incremental nature of the snapshots, simply deleting the data and metadata objects of SX will corrupt those child snapshots and prevent them from being restored properly. Second, as mentioned previously, existing cloud/object storage services generally do not provide a mechanism to lock or otherwise synchronize concurrent access to objects, which means that there is no way to lock the objects of a snapshot and prevent their deletion while a simultaneous restore from that snapshot is occurring.

To address the first challenge above, archive management agent 114 can implement a deletion workflow (shown as workflow 500 in FIG. 5 and detailed in subsection (4.1) below) that "transfers ownership" of data blocks which are part of a snapshot-to-be-deleted and are referred to by child snapshots to the immediate child of that snapshot. This ownership transfer is accomplished by creating a new metadata object for the immediate child that points to the referred-to data blocks. With this approach, all of the child snapshots will still have access to the metadata for the referred-to data blocks for restore purposes.

Further, to address both the first and second challenges above, archive management agent 114 can implement a restore workflow (shown as workflow 700 in FIG. 7 and detailed in subsection (4.2) below) that (1) takes into account the delete processing and ownership transfer described in subsection (4.1), and (2) ensures that the restore process can be completed, even if a parent snapshot of the snapshot being restored is concurrently deleted by another client. The restore workflow can achieve (2) without the need for object locks or other synchronization primitives.

4.1 Deletion Workflow

Starting with block 502 of deletion workflow 500, archive management agent 114 can receive a request to delete a particular snapshot (e.g., S0) from cloud/object storage 108. In response, agent 114 can retrieve (i.e., download) all of the metadata objects for S0 and its child snapshot (e.g., S1) from cloud/object storage 108 (blocks 504 and 506). For example, if snapshot S0 comprises X metadata objects and snapshot S1 comprises Y metadata objects, archive management agent 114 would retrieve metadata objects S0.0 through S0.X-1 and S1.0 through S1.Y-1.

At block 508, archive management agent 114 can compare the retrieved metadata objects of S0 and S1 and identify data blocks that are part of S0 and are referred to by S1 (i.e., data blocks that are in the S0 metadata but not in the S1 metadata). For these data blocks, archive management agent 114 can create a new metadata object for snapshot S1 (e.g., S1.Y) that contains the data blocks' metadata entries from the S0 metadata objects (block 510) and can upload the newly created S1.Y metadata object to cloud/object storage 108 (block 512). In this way, archive management agent 114 can transfer ownership of those data blocks from S0 to S1, such that S1.0 through S1.Y will collectively contain all of the metadata needed to restore S1 (including the data blocks in S0 that are referred to by S1).

Finally, at block 514, archive management agent 114 can delete all of the metadata objects for S0 from cloud/object storage 108 and workflow 500 can end.

Figure 6:
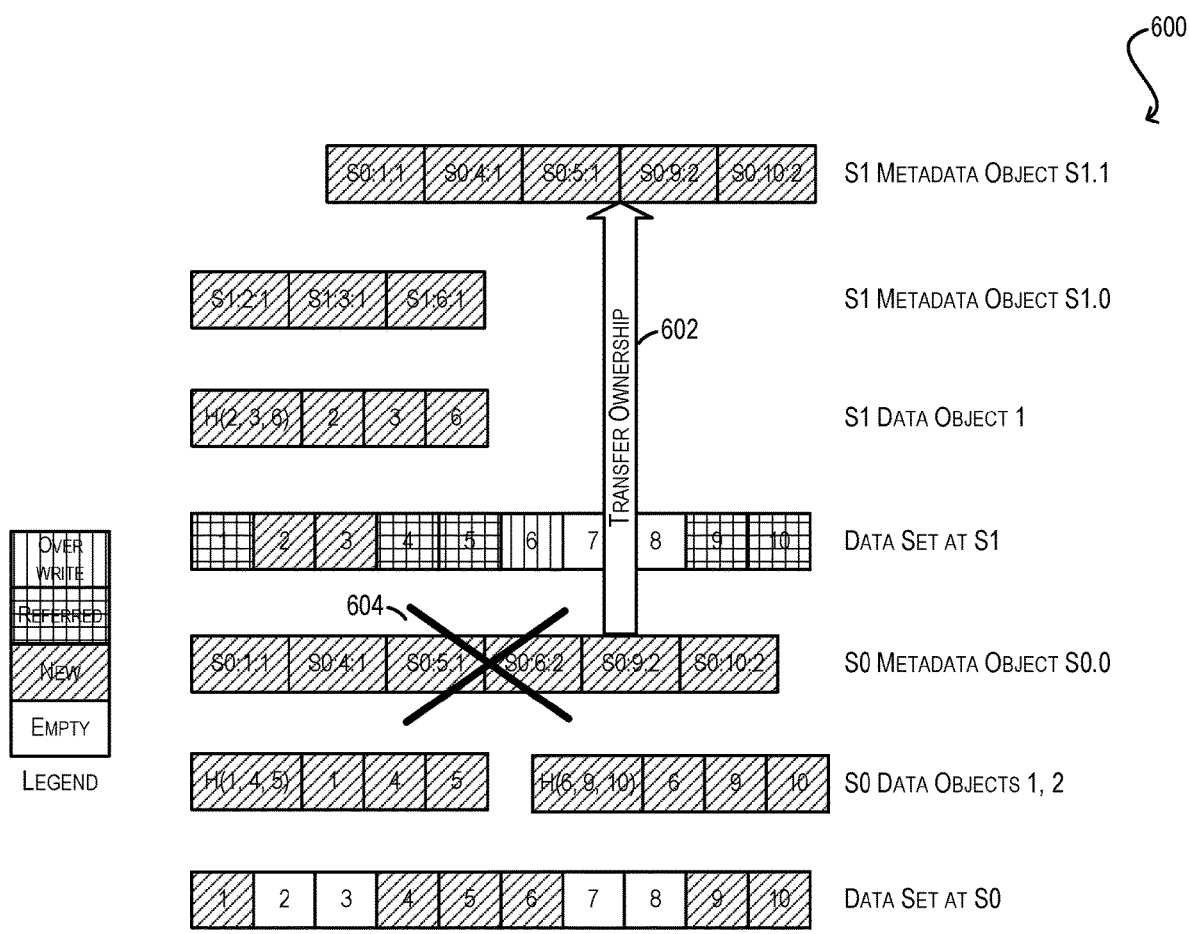
FIG. 6 is a diagram illustrating an example result of the deletion workflow of FIG. 5 according to an embodiment.

To illustrate the effects of the deletion processing of workflow 500, FIG. 6 depicts a diagram 600 of a scenario in which snapshot S0, previously shown in FIG. 3, is to be deleted. In this scenario, data blocks 1, 4, 5, 9, and 10 are maintained in the data objects of S0 and are referred to by child snapshot S1 (i.e., S1 does not explicitly include these data blocks or metadata for these data blocks). Thus, the metadata entries for referred-to blocks 1, 4, 5, 9, and 10 are copied from metadata object S0.0 of snapshot S0 into a new metadata object S1.1 of snapshot S1, thereby transferring ownership of these blocks to S1 (reference numeral 602). Metadata object S0.0 is then deleted from cloud/object storage 108 (reference numeral 604).

Figure 5:
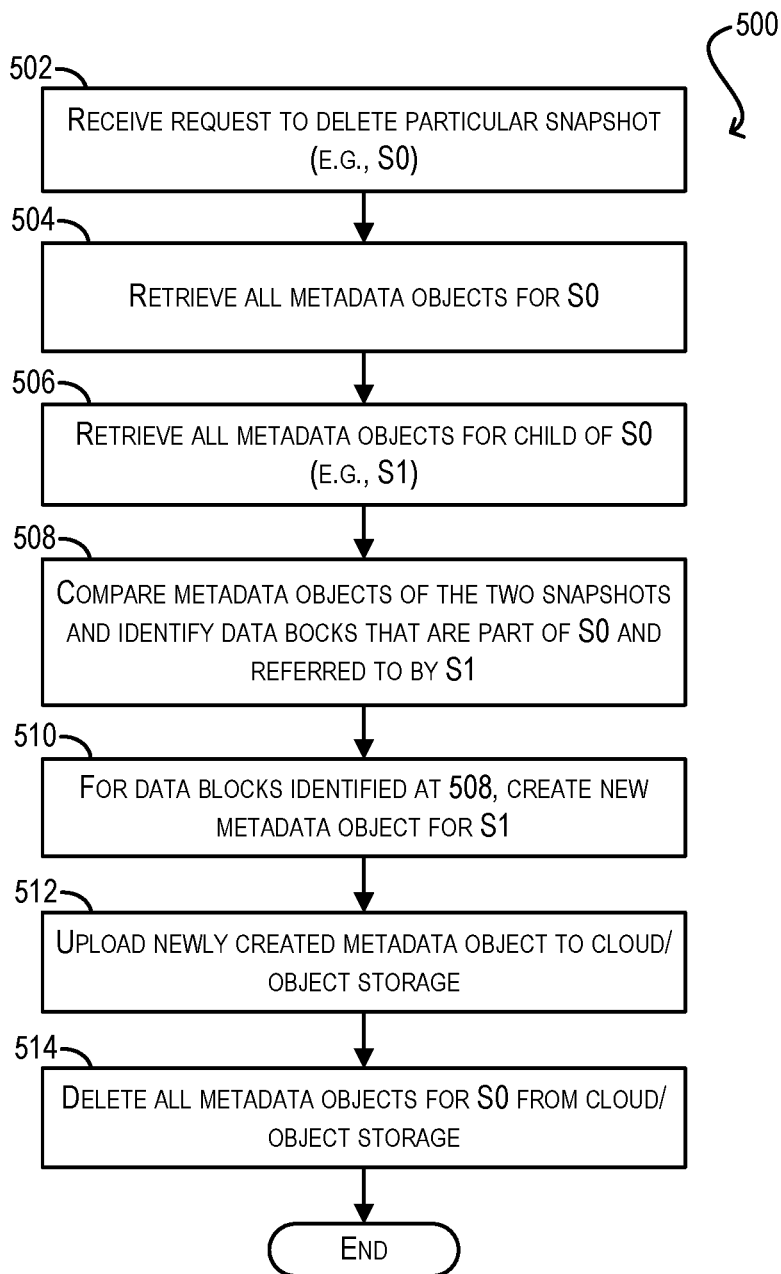
FIG. 5 depicts a deletion workflow according to an embodiment.

It should be noted that the deletion workflow of FIG. 5 does not actually delete the data objects for S0—instead, only S0's metadata objects are deleted. This is because, at the time of executing workflow 500, archive management agent 114 may not know which data objects of S0 solely comprise data blocks that have been overwritten in subsequent snapshots and thus can be safely removed.

To handle the deletion of S0's data objects, in various embodiments agent 114 can run a separate background process on a periodic basis (e.g., daily, weekly, etc.). This background process can scan cloud/object storage 108 and identify the data objects that are part of a deleted snapshot (per the deletion workflow of FIG. 5) and are no longer being referenced by any child snapshots. The background process can then safely delete the identified data objects from cloud/object storage 108.

4.2 Restore Workflow

Figure 7:
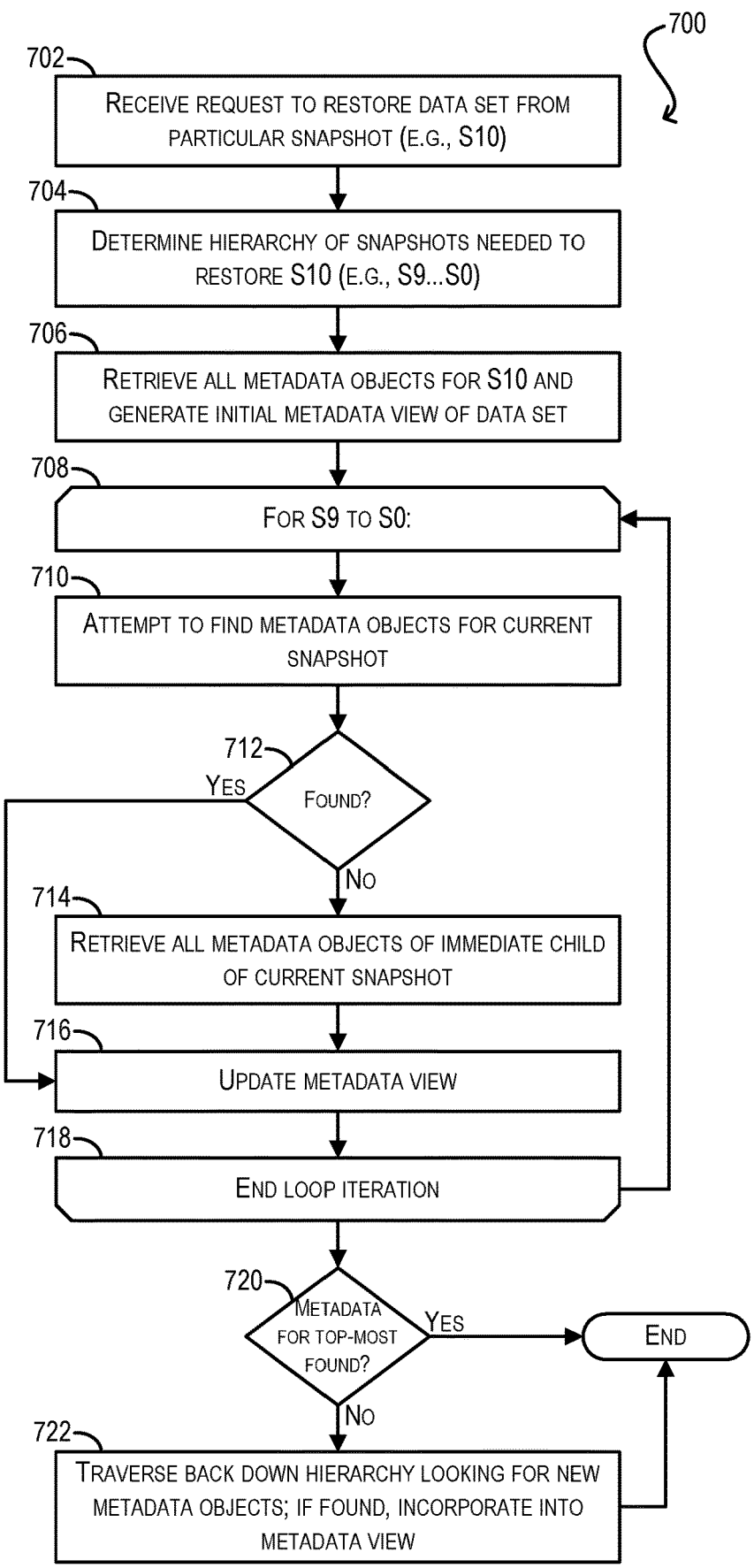
FIG. 7 depicts a restore workflow according to an embodiment.

Turning now to restore workflow 700 of FIG. 7, at blocks 702 and 704, archive management agent 114 can receive a request to restore data set 112 with respect to a particular snapshot in cloud/object storage 108 (e.g., snapshot S10) and can determine a hierarchy of snapshots needed to restore S10 (e.g., snapshots S0 through S9). The processing at block 704 can include traversing a locally cached copy of the snapshot metadata and identifying all of the snapshots that include data blocks referred to by S10.

At block 706, archive management agent 114 can retrieve all of the metadata objects for S10 from cloud/object storage 108 and generate an initial metadata view for data set 112 based on these objects. This metadata view can identify the data blocks that are part of the data set and where (i.e., in which data objects) they are stored. Agent 114 can then enter a loop that begins at the immediate child for S10 (i.e., snapshot S9) and walks up the snapshot hierarchy (block 708).

Within the loop, archive management agent 114 can attempt to find metadata objects for the current snapshot being processed (blocks 710 and 712). If no metadata objects are found, agent 114 can conclude that the snapshot has been deleted per workflow 500 of FIG. 5 and retrieve all of the metadata objects for the immediate child snapshot (which will contain at least one new metadata object if a transfer of ownership occurred) (block 714). Archive management agent 114 can then use the metadata objects for either the current snapshot or the immediate child to update the metadata view generated at block 706 (block 716) and the current loop iteration can end (block 718). This loop can be repeated until archive management agent 114 has walked up to the top-most snapshot in the snapshot hierarchy (i.e., S0).

At block 720, if one or more metadata objects for top-most snapshot S0 were found, archive management agent 114 can conclude that the entirety of S10 can be recovered and workflow 700 can end. However, if no metadata objects for top-most snapshot S0 were found, S0 may have been deleted. Accordingly, at block 722, archive management agent 114 can traverse back down the snapshot hierarchy looking for any new metadata objects in those child snapshots that were not found before; if any such new metadata object is found, it can be incorporated into the metadata view. Once this is complete, workflow 700 can be terminated.

4.3 Range-Based Deletion

In some cases, it may be useful to backup snapshots to cloud/object storage 108 on a relatively frequent basis (in order to ensure that a relatively recent snapshot is available for restore purposes if needed), but only retain a subset of those snapshots, such as weekly or monthly snapshots, for long-term archival/storage (in order to reduce the amount of storage space consumed by these snapshots over the long term). This essentially requires archive management agent 114 to delete all of the snapshots created within a particular historical time range at set intervals (e.g., delete, on every Sunday, all daily snapshots created over the past week).

There are a number of ways in which this range-based deletion can be efficiently implemented, assuming the following: (1) new data objects created for each snapshot have a monotonically increasing ID; (2) all snapshot metadata is cached/staged locally on client system 102 and archive management agent 114 can take advantage of this local metadata to determine the delta between two archived snapshots; and (3) for a given pair of "current" and "previous" snapshots (i.e., snapshots that will be retained in cloud/object storage 108 and that sit at the endpoints of the time range of snapshots to be deleted), all of the overwritten and non-overwritten data between the two snapshots can be retrieved by reading the previous snapshot.

According to a first approach, archive management agent 114 can walk the metadata of the current and previous snapshots and can identify and delete only the "fully free" data objects. These fully free data objects can be identified by finding the objects that were created by the previous snapshot but not referred to by the current snapshot.

According to a second approach, archive management agent 114 can calculate a difference between the current and previous snapshots and upload the entirety of this difference to cloud/object storage 108 (even if portions of that difference were already uploaded as part of an earlier snapshot). Once this is performed, agent 114 can delete all of the snapshots between the previous and current snapshots, including their data objects.

While this second approach involves uploading some amount of extra data to cloud/object storage 108, the extra data will generally be less than the sum of the change rate across the deleted snapshots. For example, assume the previous snapshot is a snapshot S0 created last Sunday, the current snapshot is a snapshot S7 created this Sunday, and the range of snapshots to be deleted are snapshots S1-S6 created daily on Monday through Saturday. Further assume that the degree of change between each daily snapshot S0, S1, S2, S3, S4, S5, S6, and S7 is approximately 2%. In this scenario, the degree of change between weekly snapshots S0 and S7 will generally be less than 2%×7=14%, given that some data blocks will have likely been overwritten multiple times during the 7 day time period.

According to a third approach, the upload in the second approach above can be optimized, such that portions of the difference data that are in fragmented data objects (i.e., data objects that include some number of referred-to data blocks) are copied into entirely new data objects, and the fragmented data objects are no longer referred to by the current snapshot. This allows the fragmented data objects to be deleted when the previous snapshot is deleted. In some cases, the fragmented data objects can be deleted before the previous snapshot is deleted, but this requires remapping the metadata in the previous snapshot to point to the newly created data object(s) in the current snapshot.

4.4 Batched Deletion

In addition to the various deletion techniques described above, to reduce the amount of network I/O between client system 102 and cloud/object storage 108, archive management agent 114 can also delete snapshots in a batched manner. With batched deletion, any data block that is not referred to by the child of a snapshot to be deleted can be safely deleted, which advantageously minimizes the amount of metadata that agent 114 needs to download from cloud/object storage 108 and traverse for deletion. Another advantage of batched deletion is that the deletion process can be triggered at a time when there is low data change rate, thereby minimizing the impact of this process on the storage infrastructure.

4.5 Restoring from a Replicated Region

Some cloud/object storage services perform cross-region replication of their objects (i.e., replication of the objects from one geographical region to another) for disaster recovery/mitigation purposes. Generally speaking, this cross-region replication does not provide write-ordering guarantees. For example, if objects O1, O2, and O3 are uploaded in that order to a first region of cloud/object storage 108, object O3 may get replicated to a second region before O2 and O1, even though O2 and O1 were written first to the first region.

To account for this, in situations where archive management agent 114 is restoring a snapshot from a region R2 that is replicated from an original region R1 where the snapshot was originally uploaded, agent 114 can perform a pre-restore verification step to verify all data and metadata objects needed for the restore process are present in R2. If not, agent 114 can abort the restore process.

Alternatively, during the restore process, archive management agent 114 can check the status of objects that are not found in R2 to determine if they are in the process of being replicated. If so, agent 114 can retry the restore process until all such objects are have been replicated and made available in R2.

5. Handling Fragmentation

One problem with the object format described in section (3) above is that, as new incremental snapshots are archived in cloud/object storage 108, there will be increasing fragmentation of the stored data objects. This is because some data blocks in older data objects will be overwritten via newer data objects in newer snapshots, but some other data blocks in the older data objects will still be referred to by the newer snapshots. This results in bad data locality for the restore process and prevents archive management agent 114 from freeing (i.e., deleting) those fragmented data objects from cloud/object storage 108, since they still contain some data blocks that are needed to restore from a newer snapshot.

It is possible to address this by implementing an active defragmentation solution that downloads all the data objects from cloud/object storage 108, identifies the "valid" data blocks in the objects (i.e., data blocks that are still being referred to by child snapshots), writes the valid data blocks to new data objects, writes the new data objects to storage 108, and then deletes the old data objects from storage 108. However, this approach is impractical for several reasons. First, it is very costly in terms of the network I/O needed to download and upload the data objects. Second, it requires remapping of the metadata in the metadata objects of the archived snapshots so that they properly reference the newly created data objects and no longer reference the deleted data objects, which incurs CPU overhead and results in further network I/O. Third, it requires complex data structures to be maintained on the client side, such as B+ trees, to keep track of and identify the fragmented objects.

Figure 8:
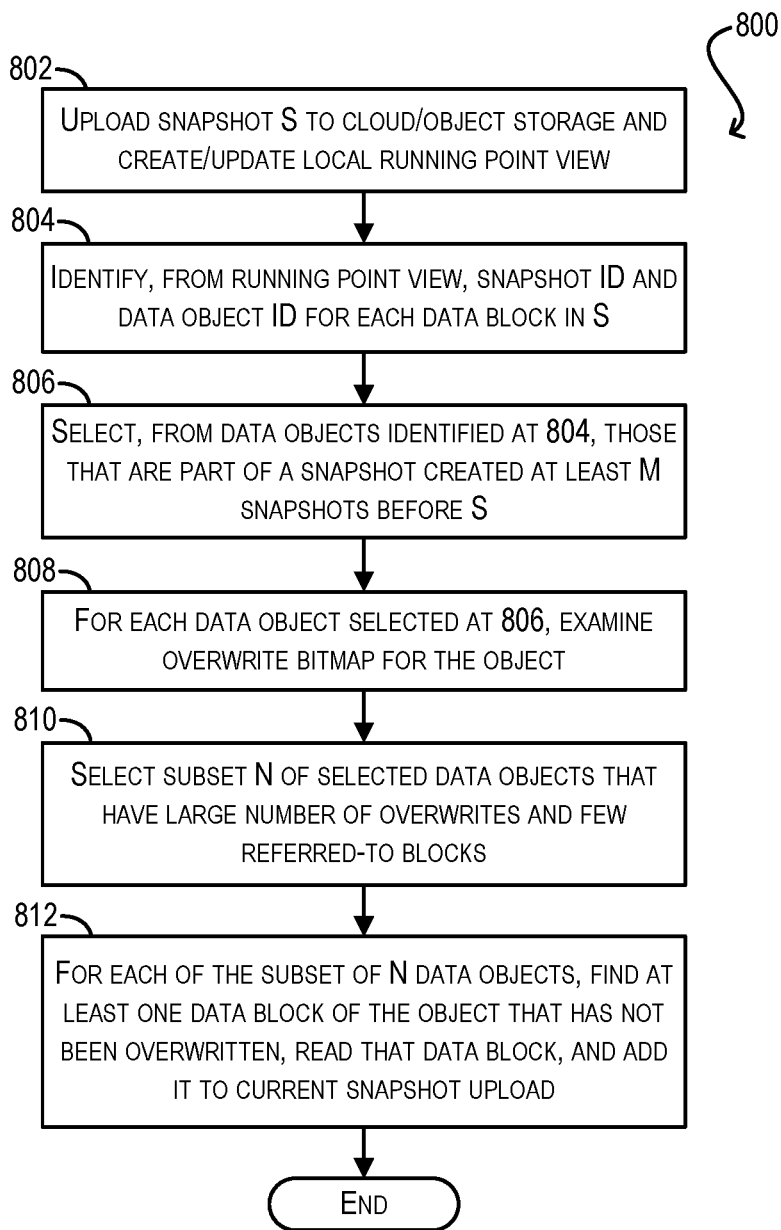
FIG. 8 depicts a workflow for handling fragmentation according to an embodiment.

A better approach for handling fragmentation is shown in the form of workflow 800 of FIG. 8. At a high level, this workflow involves identifying, for each snapshot upload, data objects from old snapshots that are still being referred to in the current snapshot and overwriting a small number of data blocks from those old data objects in the current snapshot (even though the data blocks are not actually modified in the current snapshot). This moves a small portion of data from older snapshots to the latest snapshot and ensures that older data objects will eventually be completely overwritten and thus can be deleted/freed from cloud/object storage 108.

While the workflow of FIG. 8 incurs a small amount of extra data upload per snapshot, it achieves defragmentation without requiring the large upfront network I/O and CPU utilization costs demanded by the active defragmentation solution mentioned previously. Thus, this workflow can be viewed as amortizing the costs of defragmentation over time. In various embodiments, the amount of extra data that is uploaded per snapshot can be capped via a user-defined parameter (e.g., 10% of the snapshot size).

Turning now to FIG. 8, at block 802, archive management agent 114 can first upload a given snapshot S to cloud/object storage 108. For example, agent 114 may execute upload workflow 200 of FIG. 2 with respect to snapshot S. As part of this upload processing, agent 114 can create/update a locally cached "running point view" of data set 112 which indicates, for each block of the data set, which snapshot and data object that block is currently stored in.

At block 804, archive management agent 114 can walk through each data block in S and identify, from the running point view, the snapshot ID and data object ID for the data block. Further, archive management agent 114 can select, from among the data objects identified at block 804, the data objects that are part of a snapshot that was created at least M snapshots before current snapshot S (block 806), where M is a user-configurable value. In this way, agent 114 can select the oldest data objects in cloud/object storage 108 that include data blocks referred to S.

At block 808, archive management agent 114 can, for each selected data object, examine a bitmap that references the "degree of overwrite" in the data object, where a value of 0 in the bitmap indicates that a given block in the data object has not be overwritten and a value of 1 indicates that the given block has been overwritten. These bitmaps can be maintained and cached on client system 102 at the time of each snapshot upload.

Archive management agent 114 can then select a subset N of the data objects that have a relatively large number of overwrites and relatively few referred-to blocks per their respective bitmaps (block 810). The value N can be determined, as least in part, by the "extra data upload" parameter mentioned previously.

At block 812, archive management agent 114 can, for each of the subset of N data objects, find at least one data block that is marked as 0 in the data object's bitmap (i.e., has not yet been overwritten), read that data block from data source 110, and add the data block to the current snapshot upload. This is essentially the mechanism of adding "extra data" to the snapshot for defragmentation purposes. Finally, once agent 114 has completed this step for all N data objects, workflow 800 can end.

6. Supporting Glacier Tiering

Several existing cloud/object storage services offer two separate tiers of storage: a "standard" tier which storage clients (such as client system 102 of FIG. 1) normally put and get data from, and a "glacier" tier which is significantly cheaper than the standard tier but is also significantly slower to access (and thus is intended for very long-term retention of infrequently used data).

Typically, cloud/object storage services that offer a glacier tier also support an automated data migration feature referred to as "glacier tiering." This feature allows customers to set up a lifecycle management policy which automatically migrates objects from the standard tier to the glacier tier after a set period of time (e.g., after an object becomes 100 days old). Once migrated, the objects are no longer available on the standard tier and must be retrieved from the glacier tier, which can potentially take several hours (as opposed to the near-real time access provided by the standard tier).

While glacier tiering is a useful feature for general data archiving, it is problematic when backing up multiple incremental snapshots that build upon each other as in the embodiments of the present disclosure, since a given snapshot S may refer to data blocks that are stored in data objects of one or more older snapshots. If any of those older snapshots are automatically migrated due to their age from the standard tier to the glacier tier per the service's glacier tiering functionality, archive management agent 114 may not be able to restore snapshot S in a timely fashion because a portion of the data needed to restore S will reside on the standard tier while another portion of the data needed to restore S will reside on the glacier tier.

Figure 9:
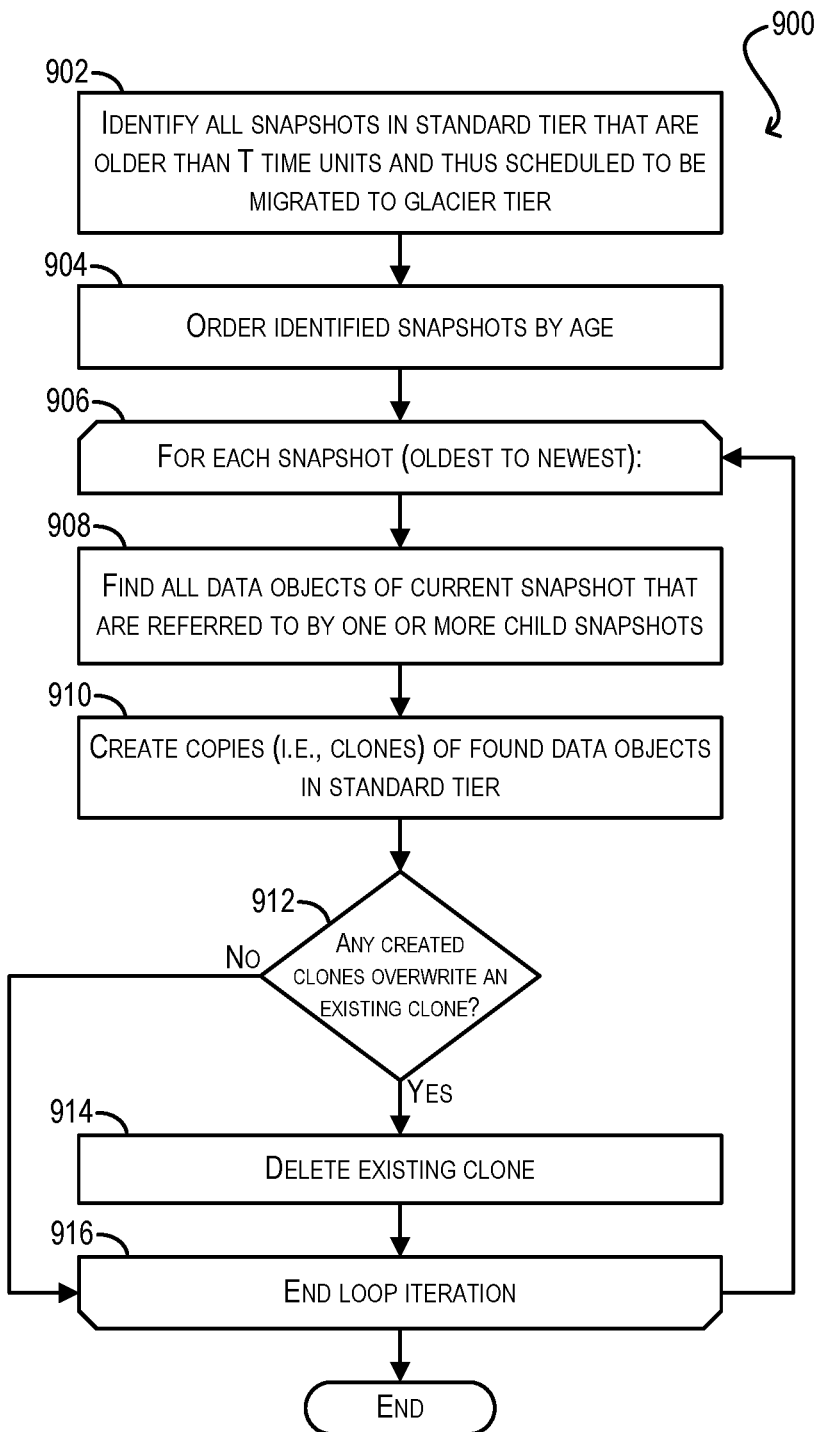
FIG. 9 depicts a workflow for cloning objects in a standard tier of cloud/object storage to support glacier tiering according to an embodiment.

To avoid this, FIG. 9 depicts a workflow 900 that can be implemented by archive management agent 114 for automatically cloning, within the standard tier of cloud/object storage 108, data objects that are scheduled to be migrated to the glacier tier and are referred to by at least one child snapshot in the standard tier. This ensures that all of the data objects needed to restore a given snapshot will always be available in the standard tier, even if glacier tiering is enabled. It is assumed that workflow 900 will be executed on a recurring basis, each time cloud/object storage 108 is ready to move objects that are older than T time units from the standard tier to the glacier tier per a pre-defined lifecycle management policy. For example, if cloud/object storage 108 is configured to migrate objects that are older than 6 months old at an interval of every 12 months, archive management agent 114 can repeat workflow 900 at the same interval of 12 months, before each migration event occurs.

Starting with block 902, archive management agent 114 can identify all of the snapshots in the standard tier of cloud/object storage 108 that are older than T time units and thus are scheduled to be migrated to the glacier tier at the next migration event. Further, at blocks 904 and 906, archive management agent 114 can order the identified snapshots according to their age and enter a loop for these snapshots, starting with the oldest one.

Within the loop, archive management agent 114 can find all of the data objects of the current snapshot that are referred to by one or more child snapshots (block 908) and create a copy of these data objects in the standard tier (block 910). For example, if the current snapshot is S1 and agent 114 determines that data objects 1, 2, and 3 of S1 are referred to by a child snapshot, agent 114 can create copies of data objects 1, 2, and 3 in the standard tier under the snapshot ID S1.1.

Additionally, archive management agent 114 can check whether any of the data object "clones" created at block 910 overwrite an existing clone for an older (i.e., parent) snapshot (block 912). If so, agent 114 can delete, from the standard tier, that existing clone for the older snapshot (block 914).

At block 916, the current loop iteration can end and the loop can be repeated for each additional snapshot. Once all of the snapshots have been processed, workflow 900 can end.

Figure 10:
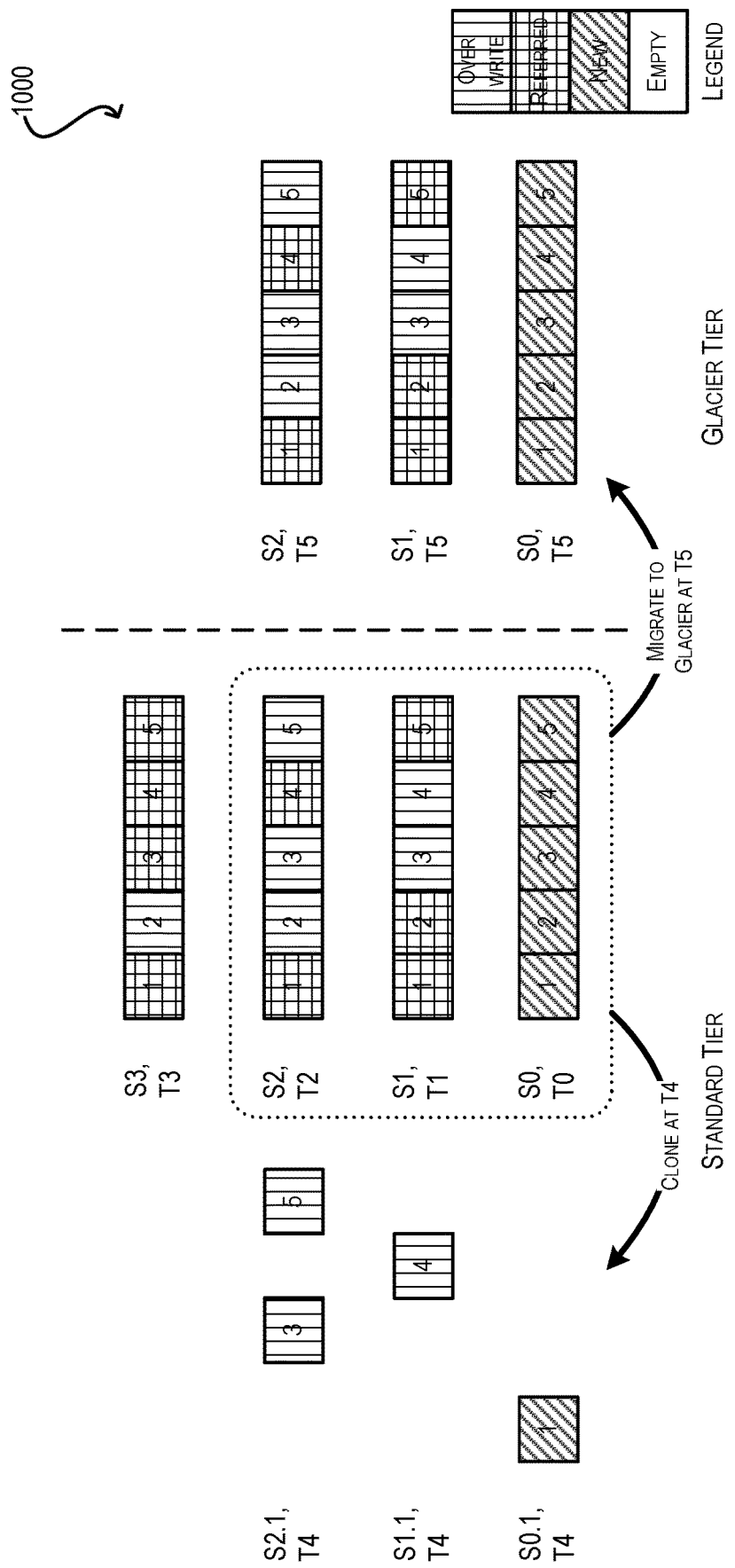
FIG. 10 is a diagram illustrating an example result of the workflow of FIG. 9 according to an embodiment.

FIG. 10 depicts a diagram 1000 illustrating the effects of workflow 900 in an example scenario. In this scenario, snapshots S0, S1, and S2 (created at times T0, T1, and T2 respectively) will be migrated from the standard tier to the glacier tier at time T5. Thus, at time T4 (i.e., before T5), clones of the referred-to data objects in S0, S1, and S2 are created in the standard tier in the context of new snapshots S0.1, S1.1, and S2.1. Note that duplicate clones (i.e., clones that overwritten by clones in subsequent snapshots) are deleted per block 914 of workflow 900 and thus do not appear here.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    deleting, by a computer system, a snapshot of a data set archived in cloud storage, the deleting comprising:
        identifying data blocks that are part of the snapshot and are referred to by an incremental child snapshot of the snapshot;
        creating a new metadata object that includes metadata entries for the identified data blocks, each metadata entry comprising an identifier of the incremental child snapshot, an identifier of a data block, and an identifier of a data object of the snapshot where the data block is stored; and
        associating the new metadata object with the incremental child snapshot in the cloud storage; and
    concurrently with the deleting of the snapshot, restoring the data set from the incremental child snapshot without locking any data objects of the snapshot.

2. The method of claim 1 wherein the deleting further comprises:
    deleting all metadata objects for the snapshot from the cloud storage.

3. The method of claim 1 wherein the deleting further comprises, at a later time:
    identifying data objects of the snapshot that do not include any data blocks referred to by child snapshots; and
    deleting the identified data objects from the cloud storage.

4. The method of claim 1 wherein the restoring comprises:
    traversing up a hierarchy of snapshots needed to restore the data set from the incremental child snapshot; and
    for each snapshot in the hierarchy:
        if one or more metadata objects for the snapshot can be found in the cloud storage, incorporating the one or more snapshots into a metadata view for the data set; and
        if one or more metadata objects for the snapshot cannot be found in the cloud storage, returning to an immediate child snapshot of the snapshot in the hierarchy and examining the immediate child snapshot to identify any new metadata objects.

5. The method of claim 1 wherein the incremental child snapshot is restored from a replicated region of the cloud storage that is different from a region of the cloud storage where the incremental child snapshot was originally uploaded.

6. The method of claim 5 wherein the restoring comprises:
    verifying, prior to initiating the restore, that all objects needed for restoring the data set are present in the replicated region.

7. A non-transitory computer readable storage medium having stored thereon program code executable by a computer system, the program code embodying a method comprising:
    deleting a snapshot of a data set archived in cloud storage, the deleting comprising:
        identifying data blocks that are part of the snapshot and are referred to by an incremental child snapshot of the snapshot;
        creating a new metadata object that includes metadata entries for the identified data blocks, each metadata entry comprising an identifier of the incremental child snapshot, an identifier of a data block, and an identifier of a data object of the snapshot where the data block is stored; and
        associating the new metadata object with the incremental child snapshot in the cloud storage; and
    concurrently with the deleting of the snapshot, restoring the data set from the incremental child snapshot without locking any data objects of the snapshot.

8. The non-transitory computer readable storage medium of claim 7 wherein the deleting further comprises:
    deleting all metadata objects for the snapshot from the cloud storage.

9. The non-transitory computer readable storage medium of claim 7 wherein the deleting further comprises, at a later time:
    identifying data objects of the snapshot that do not include any data blocks referred to by child snapshots; and
    deleting the identified data objects from the cloud storage.

10. The non-transitory computer readable storage medium of claim 7 wherein the restoring comprises:
    traversing up a hierarchy of snapshots needed to restore the data set from the incremental child snapshot; and
    for each snapshot in the hierarchy:
        if one or more metadata objects for the snapshot can be found in the cloud storage, incorporating the one or more snapshots into a metadata view for the data set; and
        if one or more metadata objects for the snapshot cannot be found in the cloud storage, returning to an immediate child snapshot of the snapshot in the hierarchy and examining the immediate child snapshot to identify any new metadata objects.

11. The non-transitory computer readable storage medium of claim 7 wherein the incremental child snapshot is restored from a replicated region of the cloud storage that is different from a region of the cloud storage where the incremental child snapshot was originally uploaded.

12. The non-transitory computer readable storage medium of claim 11 wherein the restoring comprises:
    verifying, prior to initiating the restore, that all objects needed for restoring the data set are present in the replicated region.

13. A computer system comprising:
    a processor; and
    a non-transitory computer readable medium having stored thereon program code that causes the processor to:
        delete a snapshot of a data set archived in cloud storage, the deleting comprising:
            identifying data blocks that are part of the snapshot and are referred to by an incremental child snapshot of the snapshot;
            creating a new metadata object that includes metadata entries for the identified data blocks, each metadata entry comprising an identifier of the incremental child snapshot, an identifier of a data block, and an identifier of a data object of the incremental child snapshot where the data block is stored; and
            associating the new metadata object with the incremental child snapshot in the cloud storage; and
        concurrently with the deleting of the snapshot, restore the data set from the incremental child snapshot without locking any data objects of the snapshot.

14. The computer system of claim 13 wherein the deleting further comprises:
    deleting all metadata objects for the snapshot from the cloud storage.

15. The computer system of claim 13 wherein the deleting further comprises, at a later time:
    identifying data objects of the snapshot that do not include any data blocks referred to by child snapshots; and
    deleting the identified data objects from the cloud storage.

16. The computer system of claim 13 wherein the restoring comprises:
   traversing up a hierarchy of snapshots needed to restore the data set from the incremental child snapshot; and
   for each snapshot in the hierarchy:
      if one or more metadata objects for the snapshot can be found in the cloud storage, incorporating the one or more snapshots into a metadata view for the data set; and
      if one or more metadata objects for the snapshot cannot be found in the cloud storage, returning to an immediate child snapshot of the snapshot in the hierarchy and examining the immediate child snapshot to identify any new metadata objects.

17. The computer system of claim 13 wherein the incremental child snapshot is restored from a replicated region of the cloud storage that is different from a region of the cloud storage where the incremental child snapshot was originally uploaded.

18. The computer system of claim 17 wherein the restoring comprises:
   verifying, prior to initiating the restore, that all objects needed for restoring the data set are present in the replicated region.

* * * * *